United States Patent
Meyer et al.

(10) Patent No.: US 7,895,197 B2
(45) Date of Patent: Feb. 22, 2011

(54) HIERARCHICAL METADATA GENERATOR FOR RETRIEVAL SYSTEMS

(75) Inventors: Marek Meyer, Schwalbach (DE); Tomas Hildebrandt, Darmstadt (DE)

(73) Assignee: SAP AG, Walldorf (DE)

( * ) Notice: Subject to any disclaimer, the term of this patent is extended or adjusted under 35 U.S.C. 154(b) by 315 days.

(21) Appl. No.: 11/799,030

(22) Filed: Apr. 30, 2007

(65) Prior Publication Data

US 2008/0270361 A1    Oct. 30, 2008

(51) Int. Cl.
G06F 7/00 (2006.01)
G06F 17/30 (2006.01)

(52) U.S. Cl. .................. 707/728; 707/758; 707/802; 715/234

(58) Field of Classification Search ............ 707/3, 707/5, 6, 102, 999.003, 999.005, 999.006, 707/999.102, 728, 731, 758, 802; 715/234
See application file for complete search history.

(56) References Cited

U.S. PATENT DOCUMENTS

| | | | | |
|---|---|---|---|---|
| 6,356,898 | B2 * | 3/2002 | Cohen et al. | 707/5 |
| 6,377,983 | B1 * | 4/2002 | Cohen et al. | 709/217 |
| 7,529,756 | B1 * | 5/2009 | Haschart et al. | 707/100 |
| 2001/0018697 | A1 * | 8/2001 | Kunitake et al. | 707/517 |
| 2001/0049684 | A1 * | 12/2001 | Light et al. | 707/102 |
| 2002/0023114 | A1 * | 2/2002 | Ito | 707/523 |
| 2002/0052730 | A1 * | 5/2002 | Nakao | 704/10 |
| 2003/0171914 | A1 * | 9/2003 | Jung | 704/7 |
| 2004/0073541 | A1 * | 4/2004 | Lindblad et al. | 707/3 |
| 2004/0225667 | A1 * | 11/2004 | Hu et al. | 707/100 |
| 2005/0091581 | A1 * | 4/2005 | Bezrukov et al. | 715/513 |
| 2005/0154702 | A1 * | 7/2005 | Liu et al. | 707/1 |
| 2005/0246316 | A1 * | 11/2005 | Lawson et al. | 707/2 |
| 2005/0289128 | A1 * | 12/2005 | Hamaguchi | 707/3 |
| 2007/0124298 | A1 * | 5/2007 | Agrawal | 707/5 |
| 2007/0198534 | A1 * | 8/2007 | Hon et al. | 707/10 |
| 2007/0219986 | A1 * | 9/2007 | Egozi | 707/5 |
| 2007/0219994 | A1 * | 9/2007 | Lemelson | 707/7 |
| 2008/0243787 | A1 * | 10/2008 | Stading | 707/3 |
| 2009/0132482 | A1 * | 5/2009 | O'Sullivan et al. | 707/3 |

* cited by examiner

*Primary Examiner*—John Breene
*Assistant Examiner*—Phong Nguyen
(74) *Attorney, Agent, or Firm*—Brake Hughes Bellermann LLP

(57) ABSTRACT

A computer-implemented method of locating information in a database of electronic documents includes defining fragments of the documents, associating the fragments with the document from which the fragments originated, and associating metadata with the fragments, where the metadata associated with a fragment includes metadata related to one or more topics of the fragment. A query for one or more documents containing information about a topic is received, and a document is located from the database based on a comparison of the query with the metadata associated with a fragment of the document.

18 Claims, 5 Drawing Sheets

HIERARCHICAL METADATA GENERATOR FOR RETRIEVAL SYSTEMS

TECHNICAL FIELD

This disclosure relates to techniques of automated search and retrieval of information and, in particular, to a hierarchical metadata generator for retrieval systems.

BACKGROUND

With the advent and proliferation of electronic storage of documents, particularly in networked environment, more and more documents are written, exchanged, modified, and stored. Because of the overwhelming volume of documents that are available to a user, finding a particular document of interest to the user can be very difficult. Therefore, search engines have been developed for locating and retrieving relevant documents. Generally, search engines locate documents through full text searching or through metadata-based searching. In a full text mode, a search engine locates all documents within a specified database that contain the search term(s) specified by the user. In contrast, with metadata-based searching, the search engine looks only for the occurrence of the user's search term(s) in metadata records about documents in the database.

Full text searching tends to be overinclusive and often returns too many irrelevant results. One approach to mitigate the overinclusive nature of full text searching is to use ranking methods, such as, for example, Google's® PageRank® method. However, even ranked results often contain too many unsuitable hits in the top positions, sometimes as a result of the ongoing manipulation of search hits.

Metadata-based searching provides fewer and generally more relevant search results, but metadata-based searching requires that the contents of a document are described appropriately with relevant metadata tags. However, even when documents are appropriately described, metadata-based has limitations because the metadata used to describe a large document might describe only the main themes and topics of the document but not information about finer-grained details of the documents. Thus, metadata-based searching often is inadequate for locating information in individual parts of a document.

SUMMARY

In a general aspect, a computer-implemented method of locating information in a database of electronic documents includes defining fragments of the documents, associating the fragments with the document from which the fragments originated, and associating metadata with the fragments, where the metadata associated with a fragment includes metadata related to one or more topics of the fragment. A query for one or more documents containing information about a topic is received, and a document is located from the database based on a comparison of the query with the metadata associated with a fragment of the document.

In another general aspect, a computer-implemented method of locating information in a database of electronic documents includes defining fragments of the documents, maintaining an order in which the fragments appear in a document, maintaining an association between the fragments and the document from which the fragments originated, and associating metadata with the fragments, where the metadata associated with a fragment includes metadata related to one or more topics of the fragment. A query is received for one or more documents containing information about a first topic and about a second topic, and a document is located in the database based on a comparison of the query with the metadata associated with a fragment of the document.

In a further general aspect, a system for locating information in a database of documents includes a document splitting engine adapted for defining fragments of the documents, a metadata generation engine adapted for associating metadata with the fragments, wherein the metadata associated with a fragment relates to one or more topics of the fragment, a memory of storing an order in which the fragments appear in a document and for storing an association between the fragments with the document from which the fragments originated, and a query engine adapted for receiving a query for one or more documents containing information about a first topic and about a second topic and for locating a document in the database based on a comparison of the query with the metadata associated with a fragment of the document.

Implementations can include one or more of the following features. For example, defining fragments of the documents can include defining fragments of the documents based on markup tags that indicate logical components of the documents. Defining fragments of the documents can include defining fragments of the documents based on semantic content of different parts of the document.

Dividing the documents into fragments can include dividing the documents into fragments based on markup tags that indicate logical components of the documents or based on semantic content of different parts of the document. In addition, the frequency with which individual fragments are identified as relevant to search queries can be monitored and the fragments into which documents are divided can be updated based on the monitored frequency with which individual fragments are identified as relevant to search queries.

The metadata associated with at least one fragment can be based on a comparison of information in the fragment with information in an electronic encyclopedia, for example, a wiki database.

The query can include a request for one or more documents containing information about the first topic that is located within a certain proximity to information about the second topic, and locating the document in the database can be based on a comparison of the query with the metadata associated with a fragment of the document and with a comparison to the order in which the fragments appear in the document. The first topic can correspond to a context of the document, and the second topic can correspond to a topic of a fragment. Dividing the documents into fragments can include dividing the documents into fragments based on markup tags that indicate logical components of the documents. Dividing the documents into fragments can include dividing the documents into fragments based on dissimilarity measures between parts of the documents.

Dividing the documents into fragments can include dividing the documents into fragments based on markup tags that indicate logical components of the documents or based on dissimilarity measures between parts of the documents. In addition, the frequency with which individual fragments are identified as relevant to search queries can be monitored, and the fragments into which documents are divided can be updated based on the monitored frequency with which individual fragments are identified as relevant to search queries.

The details of one or more implementations are set forth in the accompanying drawings and the description below. Other features will be apparent from the description and drawings, and from the claims.

DETAILED DESCRIPTION

Figure 1:
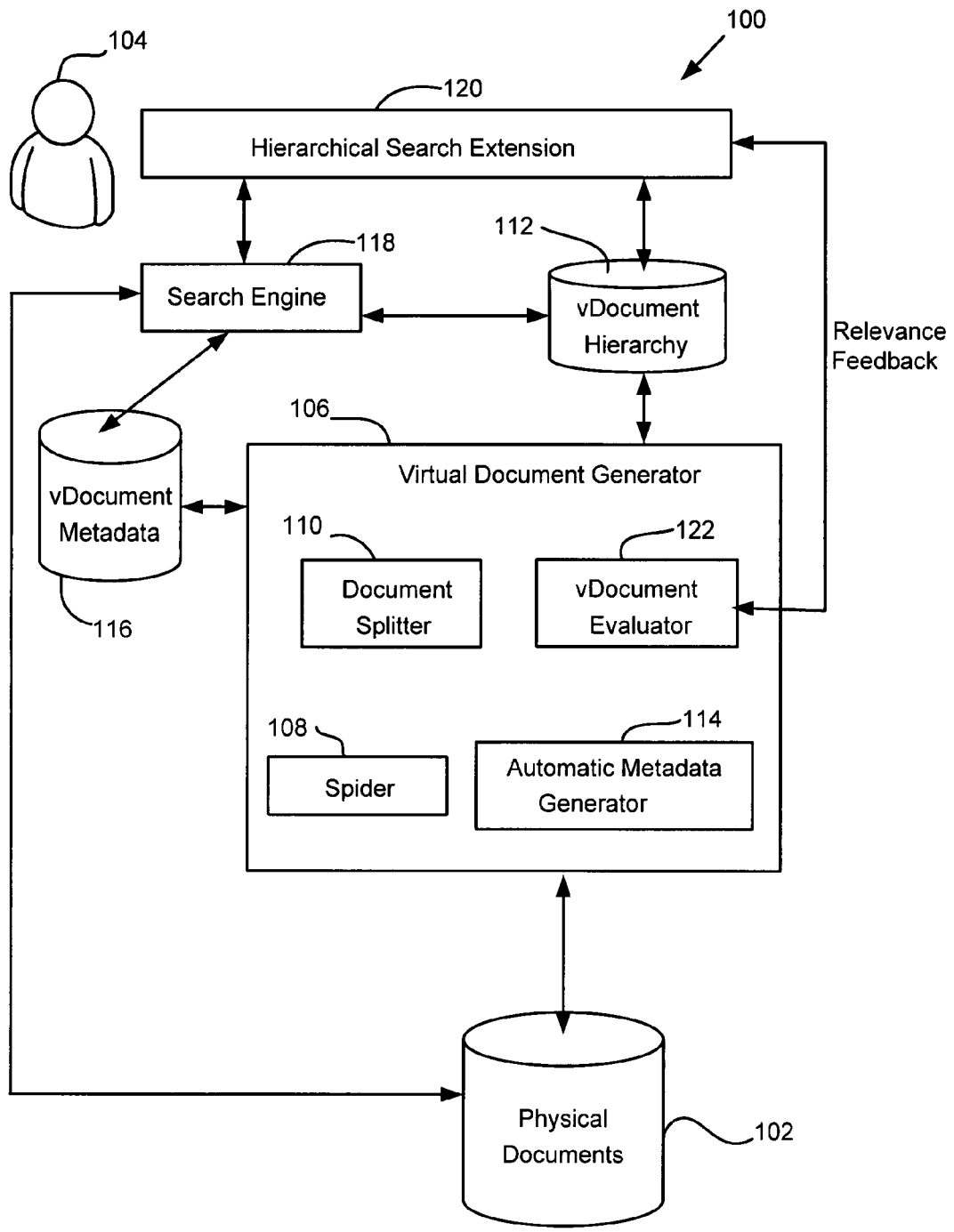
FIG. 1 is a block diagram of a system for generating hierarchical metadata for documents in a database and for locating information in the documents based on the hierarchical metadata.

FIG. 1 is a block diagram of a system 100 for generating hierarchical metadata for documents in a database and for searching for information in the documents based on the hierarchical metadata. The system includes a database 102 in which electronic documents can be stored and from which the documents can be retrieved for analysis or for provision to a user.

The database 102 can be a physical or logical database and can be localized or distributed. For example, the database 102 can be one or more storage devices, such as document servers, hard disks, or optical disks that store multiple documents, or the database can be implemented in software, such that documents can be loaded into the software application for retrieval. In one implementation, the database 102 can be a hard disk or flash memory device associated with the personal computer of a user 104. In another example, the database 102 can be one or more networked storage devices storing documents that are available to the user 104. For example, the database 102 can be storage device in a local area network (LAN) of a business or organization to which a number of members of the business or organization have access. In another implementation, the database 102 can be a number of storage devices accessible through a wide area network (WAN). For example, the database 102 can be a number of storage devices accessible through the Internet. The database 102 can be known as a physical document database 102 because it stores actual electronic documents and to distinguish it from a virtual document database, discussed below, which can store representations of the electronic documents.

The database is linked to a virtual document generator 106 that can access electronic documents in the physical document database 102 to generate metadata and indexing information about the documents in the database. The virtual document generator 106 includes a spider or web crawler engine 108 or automated script that can access the electronic documents in the database 102 by browsing the documents in a methodical, automated manner. The web crawler engine 108 can access the documents in the database 102 and create copies of the documents for further processing by the virtual document generator 106. Documents can be many different types of files that can be parsed by the virtual document generator 106, and can be stored in many different formats (e.g., PDF, DOC, HTML, XML, RAR, ZIP, TXT, PPT, XLS).

Using a copy of an electronic document from the physical document database 102, a document splitter engine 110 operates to divide the document into a number of fragments in order to define multiple document fragments for the document. For a structured document, the document splitting engine 110 can divide the document into fragments based on the document's structure. For example, for an HTML document, the document splitting engine 110 can define fragments of the document based on markup tags within the document, such as tags that define paragraphs, sections, chapters and other logical sections of the document. Similarly, for a text document, such as a document formatted in Microsoft's® Word® format, the document splitting engine 110 can divide the document into fragments based on markup tags indicating paragraphs, sections, chapters, pages, etc.

In another implementation, the document splitting engine 110 can divide the document into fragments based on the semantic content of different parts of the document. For example, the splitting engine 110 can parse the text of the document to determine where the subject matter of the document changes (e.g., by identifying dissimilarities in the semantic content of different portions of the document) and then can divide the document into fragments that are bounded by the occurrence of such subject matter changes. Thus, in a document about the effect of globalization on various different businesses, the splitting engine 110 may parse the document to determine that the document contains different parts that discuss the effect of globalization on the auto industry, on the software industry, and on the textile and apparel industry, and may define document fragments that correspond to each of the separate topics. Each fragment can be further subdivided into additional finer-grained fragments. For example, in the above example, the fragment of the document about the effect of globalization on the textile and apparel industry might include sub-fragments about labor conditions for workers in developing markets that make textiles and shoes, about deflation of prices for textiles in developed markets, and about trade relations between developed and developing markets.

In still another implementation, the splitting engine 110 can divide the document into fragments based on the size of the document and the size of fragments. For example, for a 200 kb text document, the splitting engine 100 may divided the document into equally sized parts, and may define five parts of the document that each are 40 kb in size.

The splitting engine 110 associates the fragments with the documents, for example, in an indexed table or other kind of structured database, such that the identification of fragment can be used to identify a document from which the fragment originated or vice versa. In addition, the splitting engine creates and maintains a unique identification number for the document and fragments of the document that distinguishes the document or fragment from all other documents and fragments and maintains an order in which the fragments appear in the document. For example, as shown in Table 1 below, the splitting engine 110, can create an indexed table that includes information about the location of the document (i.e., http://www.website.org/doc1), the number fragments that have been defined for the document, and the location of the fragments within the document (e.g., the paragraph number at which each document begins, as shown in Table 1). For example, as shown in the first line of Table 1, a document may be located at www.website.org/doc1 and may be assigned unique identification number "1982.0." Also, for example, a third fragment of the document may be defined to begin at the 13$^{th}$ paragraph of the document and end after the 24$^{th}$ paragraph of the document. The third fragment of the document may be assigned unique identification number "1982.3."

Each fragment can be further subdivided into additional finer-grained fragments. For example, in the above example, the fragment of the document about the effect of globalization on the textile and apparel industry might include sub-fragments about labor conditions for workers in developing markets that make textiles and shoes, about deflation of prices for textiles in developed markets, and about trade relations between developed and developing market countries concerning textiles.

For example, a document about the effect of globalization on various different businesses that is located by the URL, www.website.org/doc1, may be assigned the unique ID number 1982.0, and a fragment of the document corresponding to a section about the effect of globalization on the textile and apparel industry may be assigned unique ID number 1982.3. Sub-fragments about labor conditions for workers in developing markets, about deflation of prices for textiles in developed markets, and about trade relations between developed and developing markets could be assigned unique ID numbers 1982.3.1, 1982.3.2, and 1982.3.3, respectively.

Information associating the document with the fragments and maintaining an order of the fragments can be stored in a virtual document hierarchy database 112 of the system 100. Thus, the virtual document hierarchy database 112 can, but need not, not store copies of the document or fragments, but can instead maintain pointer information in the virtual document hierarchy database 112 that can be used to locate and retrieve the document or fragments of the document from the physical document database 102.

TABLE 1

| Document | http://www.website.org/doc1 | 1982.0 |
|---|---|---|
| Fragment | Start Paragraph | |
| 1 | 1 | 1982.1 |
| 2 | 8 | 1982.2 |
| 3 | 13 | 1982.3 |
| 4 | 25 | 1982.4 |
| 5 | 31 | 1982.5 |
| 6 | 39 | 1982.6 |
| 7 | 56 | 1982.7 |
| 8 | 63 | 1982.8 |
| 9 | 72 | 1982.9 |

The virtual document generator also includes an automatic metadata generator engine 114 for automatically generating semantic metadata about the fragments associated with a document. The metadata generator engine 114 can parse a document and/or fragments of the document and automatically generate metadata using a variety of techniques and algorithms. For example, the frequency with which a word occurs in a document or in a fragment can furnish a useful measurement of word's significance to the document or fragment, and therefore a word that appears frequently can be used as a metadata keyword for the document or fragment. Common words used primarily for syntax purposes (e.g., "a," "and," "but," "the," "his," "her," "it," etc.) in a document or fragment can be maintained in a black list, such that they are excluded from being used as metadata keywords. In another implementation, metadata keywords can be limited to verbs and nouns. The absolute frequency of appearance of a word can be used as a measure of the significance of the word to the document or fragment, or the frequency of the word's occurrence can be compared to the word's usual frequency of use in the language a generally or in the a relevant context to determine the significance of the word and whether the word should be used as a metadata keyword.

Ranking of the significance of frequently occurring words in the document or fragment can be augmented by information derived from markup tags in the document or fragment. For example, if a word appears in a title or URL of the document, the significance of the word to the document or fragment may be increased when ranking the word for use as a metadata keyword.

In another implementation, the automatic metadata generator engine 114 can automatically generate metadata by parsing the document or fragment and comparing terms or words found in the document or fragment to predefined terms or clusters of terms representing nodes of a classification hierarchy, for example, a Dewey Decimal Classification hierarchy. The Dewey Decimal Classification (DDC) hierarchy is considered as a useful classification scheme because it provides a universal and widely-accepted classification scheme covering all subject areas and geographically global information, and the hierarchical nature of the DDC allows for defining metadata for a document or fragment at different levels of granularity. A hierarchy of Java classes can be used to model the DDC hierarchy, and documents and fragments can be filtered through this hierarchy according to which class representatives best match the document's or fragment's contents.

For example, when filtering a document about the effects of globalization on business that includes a fragment about the textile and apparel industry, and sub-fragments about labor conditions of textile workers in developing markets, about deflation of prices for textiles in developed markets, and about trade relations between developed and developing markets, metadata keywords about the topic of the document can be assigned based on a match of the document's content with keywords associated with one or more DDC categories that correspond to content about business and globalization. Metadata keywords about topics of a fragment can be assigned to the fragment based on a match of the fragment's content with keywords associated with one or more DDC categories that correspond to content about the textile and apparel business, and metadata keywords can be assigned to the sub-fragments based on a match of the sub-fragments' content with keywords associated with one or more DDC categories that correspond to content about labor conditions of textile workers in developing markets, about deflation of prices for textiles in developed markets, and about trade relations between developed and developing markets.

In still another implementation, the automatic metadata generator engine 114 can automatically generate metadata by parsing the document or fragment and comparing terms or words found in the document or fragment to the content of entries of an electronic encyclopedia. In implementation, when a term in the document for fragment matches the title of an entry in the encyclopedia, then important words in the content for the entry in the encyclopedia can be used as keywords for the fragment. Thus, for example, a document or fragment containing the phrase "irrational exuberance," when parsed by the automatic metadata generator engine 114, may result in some of the following metadata keywords being generated for the document or fragment: "Alan Greenspan"; "Federal Reserve"; "Internet"; "Stock Market"; "Bubble"; "dot.com" and "Silicon Valley." In another implementation, when a relatively high correlation between the content of the document or fragment and an entry of the electronic encyclopedia exists, then the title of the encyclopedia entry can be used as a metadata keyword, or important words and phrases within the entry can be used as metadata keywords. Thus, for example, if a fragment contains the terms "Alan Greenspan," "Stock Market," "Bubble," "Internet," and "1990's," then the phrase "irrational exuberance" may be defined as a metadata keyword for the fragment based on a comparison of the content of the fragment with the content of the content of the entry for "irrational exuberance" in the electronic encyclopedia.

The encyclopedia can be an encyclopedia that only a limited number of people can edit or change or can be a more open encyclopedia, such as a wiki that allows visitors to add, remove, edit, and change content, typically without the need for registration. Wikis have been successful at providing a collaborative forum for productive interaction and operation among many users to quickly generate relevant information content. Examples of wikis include the WikiWikiWeb and Wikipedia, which are accessible through the Internet. However, other wikis can also be provided for users of a local area network, e.g., people who work together within an organization or business who develop and maintain a wiki abut information concerning topics or interest or relevance to the organization or business.

In addition to metadata about the semantic content of a documents or fragment, the automatic metadata generation engine 114 also can add extra additional descriptive metadata about the document or fragment. For example, the engine 114 can extract metadata about the word count, the MIME type, the initial publication date, the latest revision date, the word count, the creator(s), contributor(s), the publisher, and the language of the document or fragment.

Once metadata have been identified or generated for a document or a fragment of a document, the metadata can be associated with the pertinent document or fragment, so that the metadata can be used later to locate and retrieve the document or fragment. In one implementation, the metadata can be stored in an XML document about the document or fragment using the Resource Description Framework (RDF) metadata model. For example, metadata keywords can be stored in an RDF Bag container. The XML document also includes a reference pointer to the related document that is located in the physical document database 102 and to information stored in the virtual document hierarchy database 112 about the order in which fragments occur in the physical document.

Thus, such an XML document can function as a virtual document that stores meta-information about a document or fragment of a document that exists in the physical database 102. The XML-formatted virtual documents can be stored in a virtual document database 116 and used by a query engine 118 to search for information about the documents in the physical document database 102. For example, the virtual document database 116 can be queried, and matching results of the query can be mapped to associated physical documents in the database 102. By querying the virtual document database 116 that contains metadata for fragments in addition to metadata for documents, queries can be performed on different levels of granularity.

The query engine 118 can also be referred to as a "search engine." However, it should be understood that although a traditional browser-based search engine is one implementation of the query engine 118, the query engine can be any engine that receives query terms from a user and locates information based on the query terms.

For example, metadata assigned to a document about the effect of globalization on various different businesses, can include the keywords "globalization," "business," "economics," "markets," "free trade," "tariffs," and "outsourcing." However, for a fragment within the document dealing with the negative effects of globalization in the textile and apparel industry, the following metadata keywords might be assigned to the fragment: "globalization," "textiles" "Nike®," "Indonesia," "China," "sweatshops," "child labor," "pollution," "environment." Clearly, because the metadata assigned to individual fragments varies according to the content of the fragments and is different from the metadata assigned to the document of which the fragment is a part, querying the database 116 that includes virtual documents for fragments yields different, richer search results than if the database 116 included only virtual documents for entire documents. Thus, by splitting a document into fragments, and possibly subfragments, and then assigning metadata to the individual fragments, the system creates a virtual document database 116 that allows for richer searching on various levels of granularity.

Moreover, metadata in the XML documents stored in the virtual document database 116 are linked to information in the virtual document hierarchy database 112, so that querying the virtual document database 116 can locate and retrieve documents that include particular combinations of fragments. For example, a user 104 might use the search engine 118 to submit a query for documents or documents containing fragments that include information about both the negative effects of globalization in the textile business and the positive effects of globalization on American financial brokerage businesses (i.e., Wall Street). Such a query could be structured as:

{FRAG1.contains.(globali?ation AND textiles AND (Nike OR Indonesia OR China) AND (sweatshop OR "child labor" OR pollution)) AND FRAG2.contains.(globali?ation AND profit AND ("Wall Street" OR "Goldman Sachs" OR "Morgan Stanley" OR "Merrill Lynch" or Lehman))}

By running such a query on the database of atomized virtual documents 116, the database may return results that point the user to physical documents in the database 102, which contain fragments that are narrowly focused on each topic of interest to the user, without obtaining too many "false positives," and without missing too many documents that might be missed if the query were run only on the metadata of the document as a whole.

In another implementation, the user 104 may use a hierarchical search extension script 120 of the search engine 118 to query for documents containing fragments about particular topics that occur in documents and that are located within a certain proximity of one another. For example, a user may use the hierarchical search extension script 120 of the search engine 118 to query for documents or fragments of documents contain information about the negative effects of globalization in the textile business adjacent to information about the positive effects of globalization on American financial brokerage businesses. Such a query could be structured as:

{FRAG1.contains.(globali?ation AND textiles AND (Nike OR Indonesia OR China) AND (sweatshop OR "child labor" OR pollution)) W/IN=1 FRAG2.contains.(globali?ation AND profit AND ("Wall Street" OR "Goldman Sachs" OR "Morgan Stanley" OR "Merrill Lynch" or Lehman))}, where the operator "W/IN__1" specifies that the fragments identified by FRAG1 and FRAG2 must occur within one fragment position of one another within the physical document. In other words, the fragments containing information the negative effect of globalization on the textile business and the positive effect of globalization on Wall Street must be adjacent to each other to satisfy the search query. When such a hierarchical search query is entered by the user 104 into the search engine 118, the search engine may locate virtual documents and fragments in the database 116 based a matching of the query terms with the metadata for the documents and the fragments. Then, the search engine 118 may invoke the hierarchical search extension script 120 to filter the preliminary search results for documents in which the requested fragments appear consecutively in a document by comparing the metadata of the fragments and documents of the preliminary results with the information stored in the document hierarchy database 112 about the location of the fragments in documents. For example, to determine that two fragments found the in preliminary results are adjacent to each other in a document, the hierarchical search extension script 120 may require that the two fragments have consecutive unique identification numbers (e.g., "1982.2" and "1982.3").

In another implementation, the user 104 may use the hierarchical search extension script 120 of the search engine 118 to query for documents containing fragments about particular topics and that occur within a particular order in a document. For example, the operators ">" and "<" can be used to indicate that a first fragment about a first topic or topics must come before or after a second fragment about a second topic or topics in the physical document.

Queries using the search engine 118 supplemented by the hierarchical search extension script 120 can be performed on the document level in addition to just on the fragment level. For example, if a user 104 wishes to locate documents containing a discussion of carbon compounds in the context of biology but does not with to receive many "false positive" results of documents containing a discussion of carbon compounds in the context of chemistry or medicine, the user by submit a query for documents containing a discussion of carbon compounds but that also include metadata indicating that the context of the document overall is related to biology. Thus, an example query could be structured as:

{document.contains('carbon compounds') AND context.category='biology'}

The strategy of the document splitter 110 for dividing a document into a number of component fragments can affect how useful the virtual document fragments are to the user 104 when searching for documents in the physical document database 102. The splitter should create fragments that have delimitable contents that are distinguishable from the content of the document itself, such that the metadata for the document and fragments of the document are different. Thus, for example, the fragments may need to be sufficiently small, such that their content is focused on one or more topics that differ from the overall topic(s) of the document. On the other hand, fragments that are too small may result in virtual documents for the fragments that are not useful to the user 104 because they are too narrowly focused and because having too many virtual documents in the metadata database 116 may degrade the performance of the system.

To improve the success of the splitting engine 110, a virtual document evaluation engine 122 can receive feedback about usage values of virtual documents in the virtual document database 116 and provide feedback to the splitting engine 110 to improve the quality and utility of the virtual documents in the virtual document database 116. Feedback about the usage value of the virtual documents can be obtained in a variety of ways. For example, the evaluation engine 122 can receive direct feedback from a user 104 about whether a virtual document is useful or not, or feedback can be obtained based on the frequency with which a virtual document is used to locate a physical document for a user, which the user subsequently accesses (e.g., by viewing or downloading the document). If a virtual document about a fragment of a document never results in the document being accessed by the user in a certain amount of time, the evaluation engine 122 may conclude that the splitting algorithm used by the document splitter 110 is not optimized and needs to be refined, for example, by creating fragments that are larger or smaller than the existing fragments or by creating fragments based changes in semantic content of the document as opposed to based on a fixed number of paragraphs in each fragment. In another implementation, if a virtual document about a fragment of a document never results in the document being accessed by the user in a certain amount of time, the evaluation engine 122 may conclude that techniques used by the automatic metadata generator 114 is not optimized and need to be refined to create different semantic metadata for the document or fragment.

If the evaluation engine 122 determines that a virtual document has a low usage value to the user, the engine may instruct the document splitter 110 to generate fragments of the document anew using a different algorithm than used previously, or may instruct the automatic metadata generator 114 to generate metadata for the document and fragments of the document anew using a different algorithm than used previously. By monitoring the usage value of virtual documents used to represent documents and fragments in the physical document database 102, the evaluation engine 122 can optimize the splitting and metadata generation algorithms used to determine the metadata records of the virtual documents in the virtual document database 116. Optimization techniques may use common machine learning technologies, such as, for example, support vector machines, artificial neural networks, decisions trees or similar systems. Through the optimization process, the evaluation engine can learn what techniques and algorithms work well for creating virtual documents that are predicted to have relatively high usage values.

Finally, after the splitter 110 and the metadata generator 114 operate on a document to prepare metadata about the document and its fragments, the evaluation engine 122 may determine an estimated usage value for virtual documents with metadata representing the document or fragment based on prior measurements of usage values for similar virtual documents (e.g., virtual documents for documents or fragments of a similar size, semantic density, semantic content, MIME type, etc). Then, only those virtual documents with an actual or estimated usage value above a certain threshold may be written to the virtual document database 116.

Figure 2:
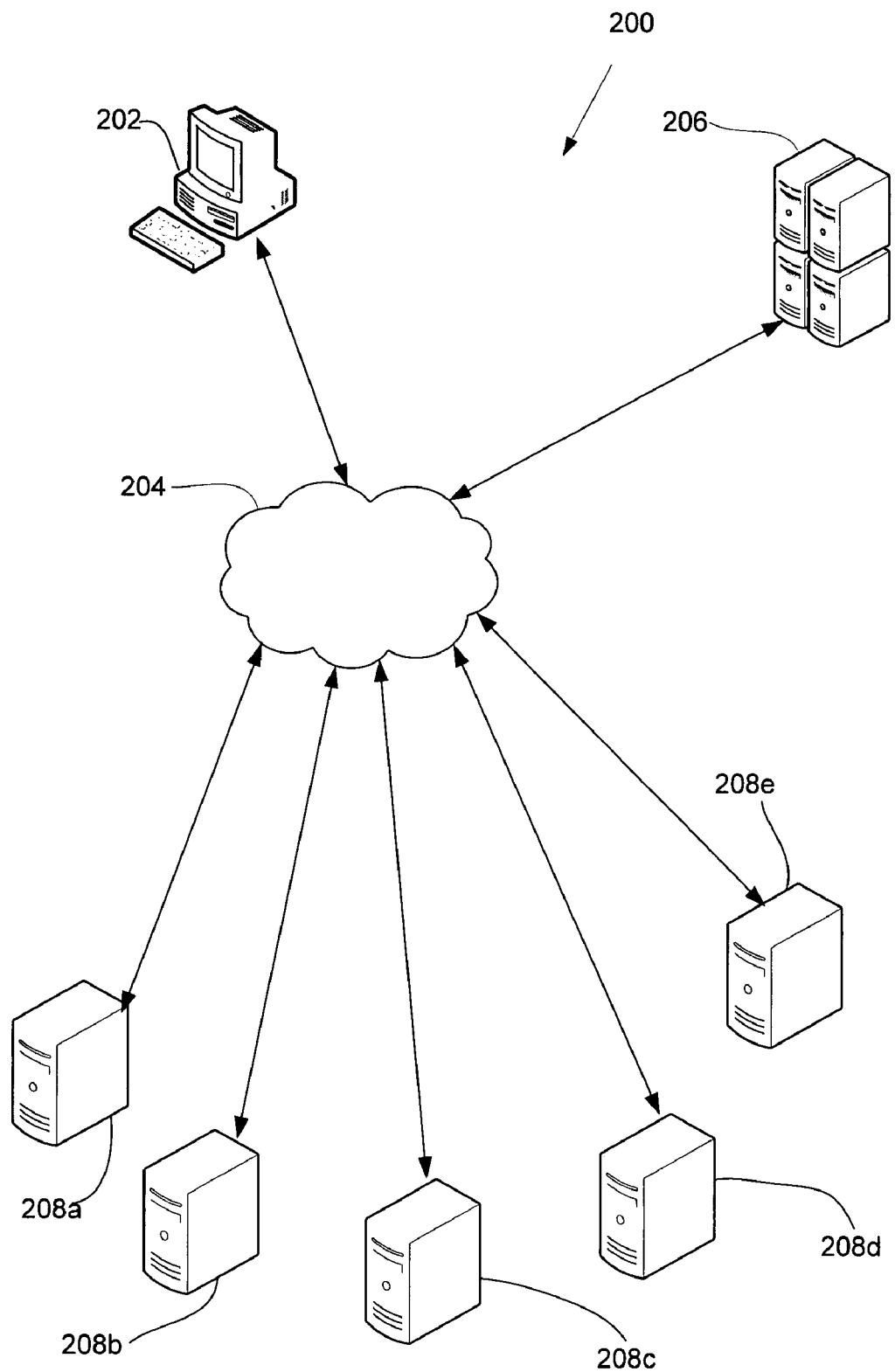
FIG. 2 is a block diagram of an example network of computing resources for implementing the system of FIG. 1

FIG. 2 is a block diagram of an example network 200 of computing resources for implementing the system of FIG. 1. The network can include a client computer 202 (e.g., a personal computer or a laptop computer) connected to a WAN 204 to allow the client computer 202 to interact with a server computer 206. The client computer 202 and the server computer 206 are also connected through the WAN 204 to other network storage servers 208*a*, 208*b*, 208*c*, 208*d*, and 208*e*. The network storage servers 208*a*, 208*b*, 208*c*, 208*d*, and 208*e* can store electronic documents to serve to a user through the WAN 204, and, thus, the network storage servers can implement the physical document database 102 of FIG. 1.

The server computer 206 can implement the spider or web crawler engine 108 for accessing physical documents stored in the physical document database, and can implement the document splitter engine 110, the virtual document hierarchy database 112, the automatic metadata generator engines 114, the virtual document metadata database 116 and the virtual document evaluation engine 122. For example, these various engines and databases can be included in a server that provides backend search engine services to a user. The search engine 118 (e.g., a browser-based search engine) and the hierarchical search engine extension 120 can be implemented on the client computer 202, and a user 104 can use the search engine 118 and extension 120 to address queries to the various engines running on the server computer 206. Based on the query parameters, the server computer 206 then can provide the location of electronic documents in the physical document database 102 matching the query terms to the search engine operating on the client computer 202.

Figure 3:
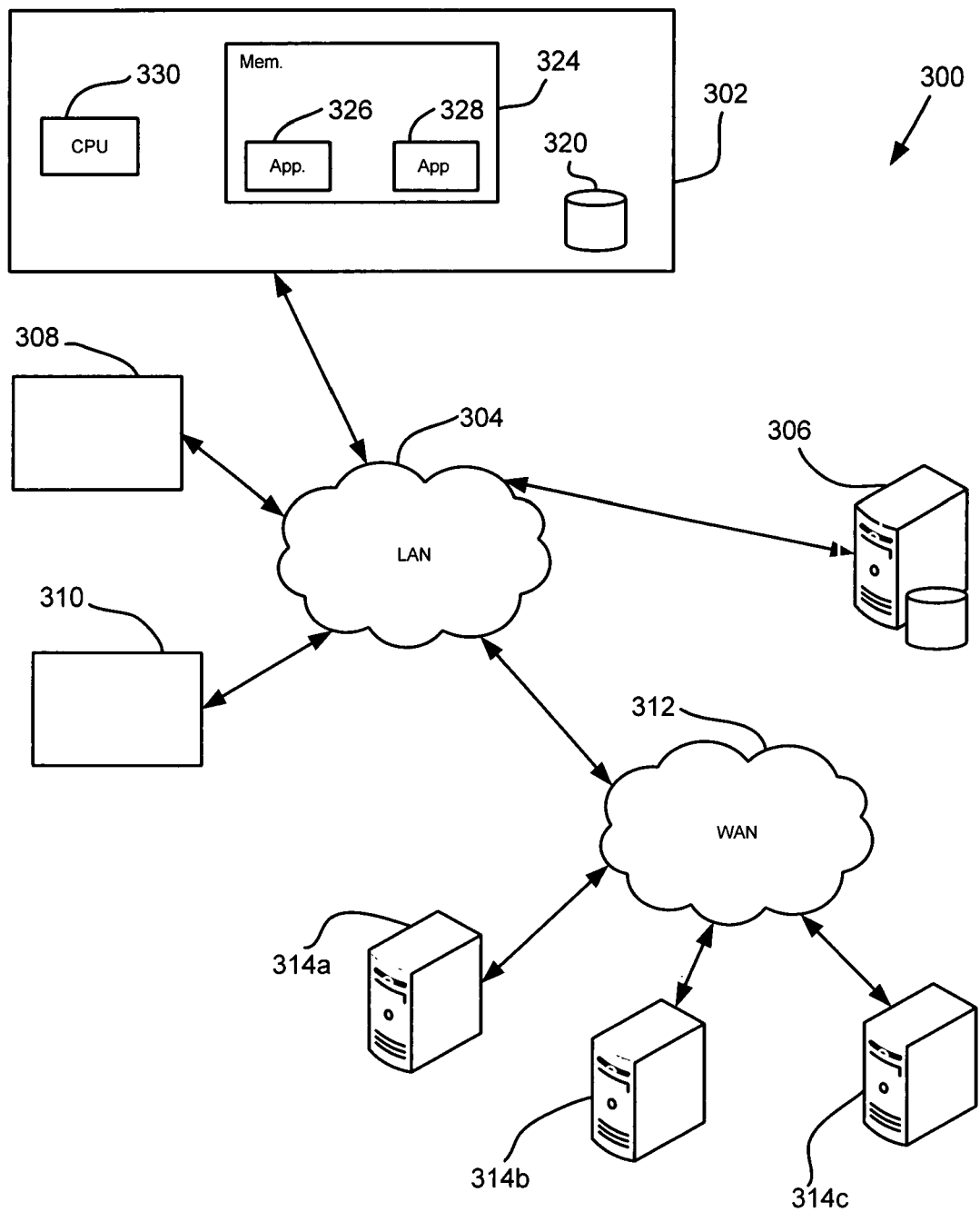
FIG. 3 is a block diagram of another example network of computing resources for implementing the system of FIG. 1.

FIG. 3 is a block diagram of another example network 300 of computing resources for implementing the system of FIG. 1. The network 300 can include a computer 302 (e.g., a personal computer or a laptop computer) that can function as a client computer when connected to a LAN 304 to allow the client computer 302 to interact with a LAN server computer 306. Other client computers 308 and 310 can also be connected to the LAN 304. The LAN 304 can be connected to a WAN 312 that is connected to one or more servers 314a, 314b, and 314c.

In this configuration, the computers 302, 308, and 310 and one or more LAN servers 306 can store electronic documents that can be served to a user. For example, the LAN may belong to a business or organization that stores its electronic documents on one or more of the computers 302, 304, 306, and 310, where the electronic documents are accessible to a number of user of the LAN within the business or organization. Thus, one or more of the computers 302, 304, 306, and 310 can implement the physical document database 102 of FIG. 1.

The LAN server 306 can implement the spider or web crawler engine 108 for accessing physical documents stored in the physical document database 102, and can implement the document splitter engine 110, the virtual document hierarchy database 112, the automatic metadata generator engines 114, the virtual document metadata database 116 and the virtual document evaluation engine 122. For example, these various engines and databases can be included in a LAN server that provides backend search engine services to a user having access to the LAN. The search engine 118 (e.g., a browser-based search engine) and the hierarchical search engine extension 120 can be implemented on the client computer 202, and a user 104 use the search engine 118 and extension 120 to address queries to the various engines running on the server computer 306. The server computer 306 then can provide the location of electronic documents in the physical document database 102 matching the query terms to the search engine operating on the client computer 202.

In another implementation, one of the client computers 302, 308, or 310 can implement the spider or web crawler engine 108 for accessing physical documents stored in the physical document database 102, and can implement the document splitter engine 110, the virtual document hierarchy database 112, the automatic metadata generator engines 114, the virtual document metadata database 116 and the virtual document evaluation engine 122. For example, these various engines and databases can be implemented in a standalone search application (e.g., a "desktop search") application running on a computer 302, 308, or 310 that indexes electronic documents accessible to the computer.

As shown in FIG. 3, computer 302 can include a memory device (e.g., a hard disk) for storing an executable computer program that implements the various engines described with respect to FIG. 1. Executable code can be loaded into a random access memory 324 as one or more applications 326 and 328 for implementing the engines, and the code can be executed by a processor 330 (e.g., a central processing unit).

Figure 4:
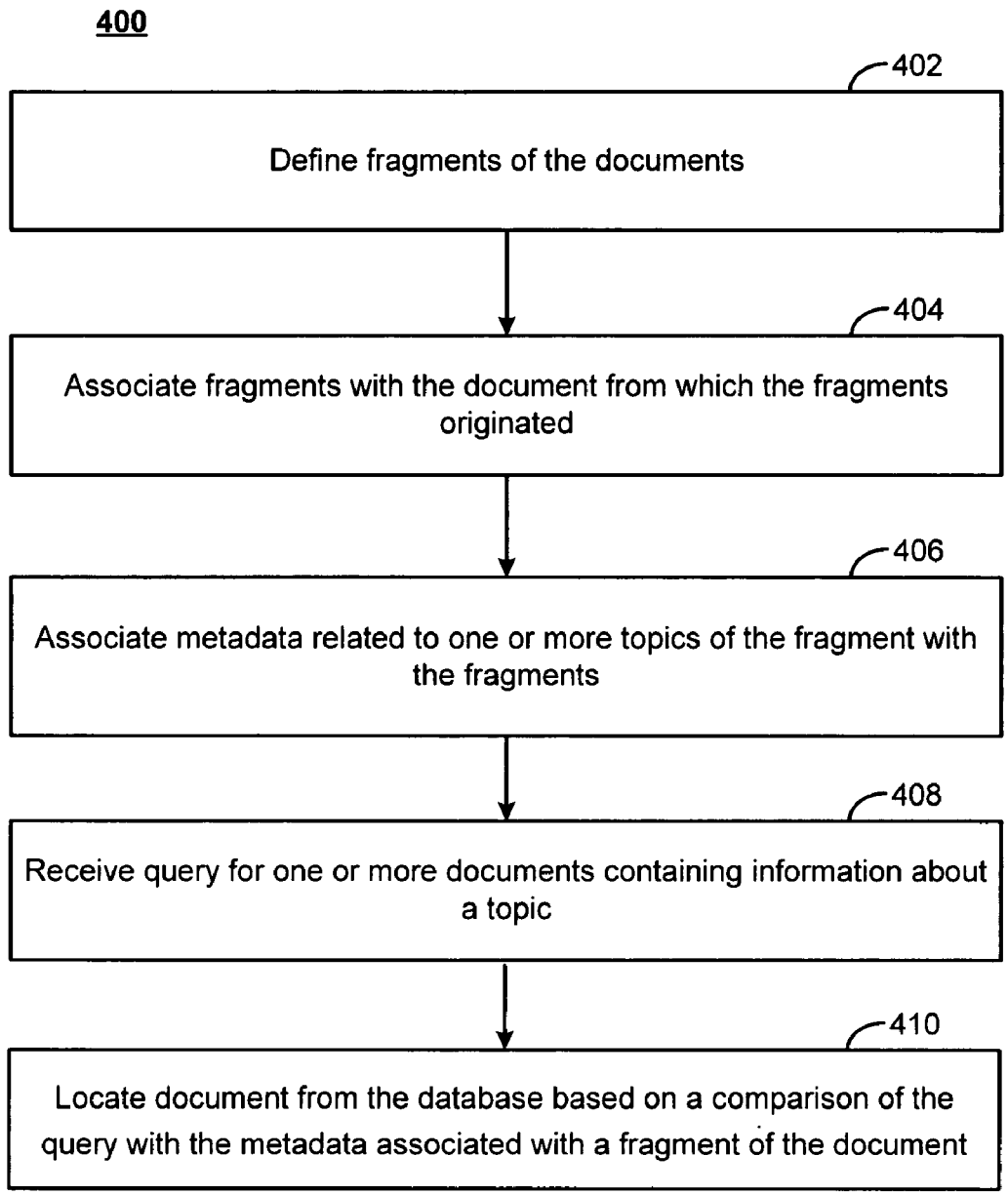
FIG. 4 is a flowchart illustrating example operations of a method for generating hierarchical metadata for documents in a database and for locating information in the documents based on the hierarchical metadata.
Figure 5:
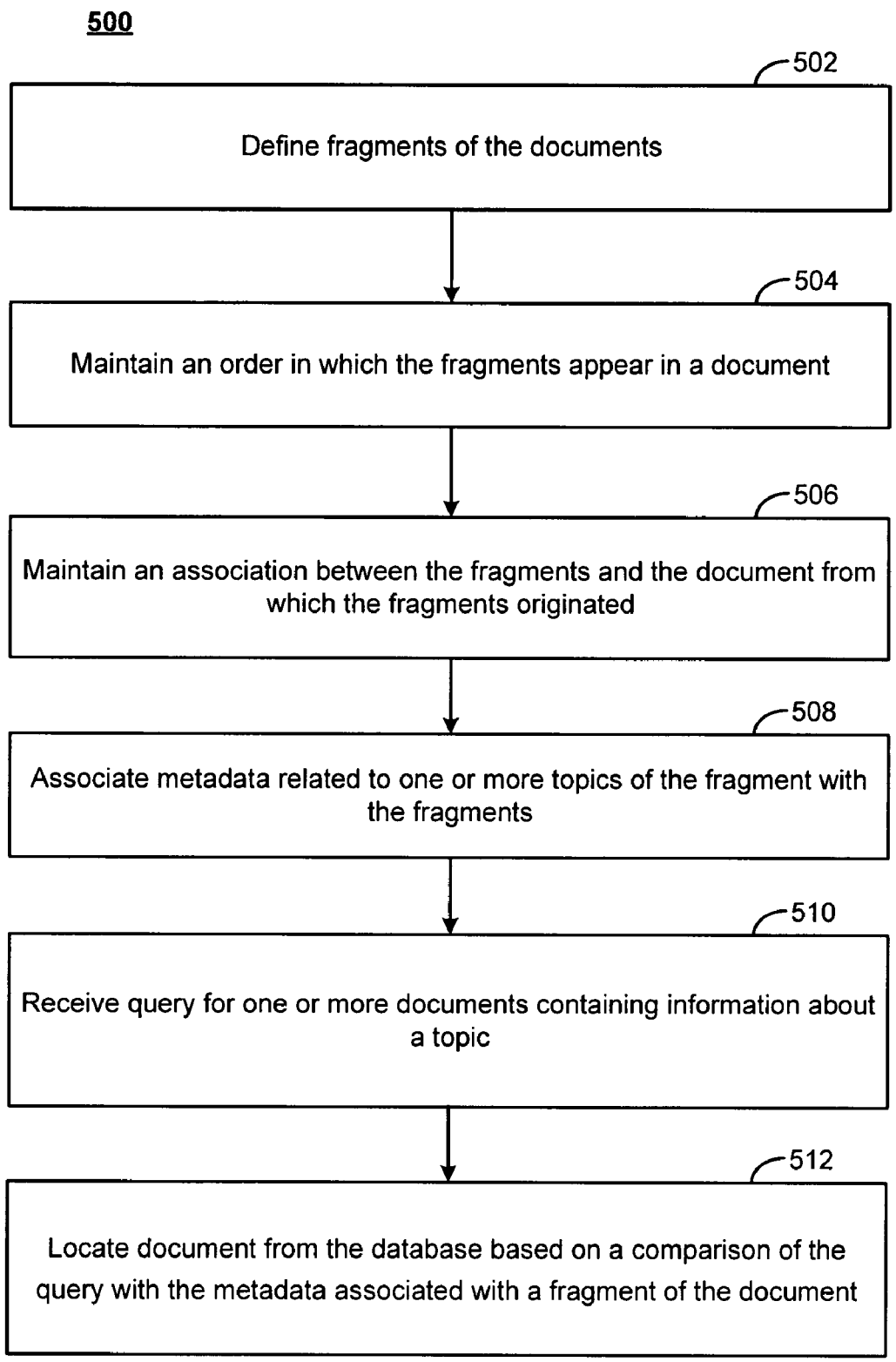
FIG. 5 is a flowchart illustrating additional example operations of another method for generating hierarchical metadata for documents in a database and for locating information in the documents based on the hierarchical metadata.

FIGS. 4 and 5 are flowcharts illustrating example computer-implemented methods 400 and 500, respectively, for locating information in a database of electronic documents. These example methods will be described with reference to FIGS. 1-3. It will be appreciated that the example methods of FIGS. 4 and 5 may be applied to either network 200 or network 300, as well as any number of other arrangements of resources.

As shown in FIG. 4, in method 400 fragments of the documents are defined (step 402), e.g., with use of the document splitting engine 110 shown in FIG. 1. Fragments are associated with the document from which the fragments originated (step 404). For example, the document splitting engine 110 can stored a table in the document hierarchy database 112 listing associations between fragments and the physical documents from which the fragments originated. Metadata is associated with the fragments, where the associated metadata includes metadata related to one or more topics of the fragment (step 406). For example, the automatic metadata generation engine 114 can define metadata for a document fragment and associate the metadata with the fragment (e.g., in an XML document stored in the virtual document metadata database 116). A query is received for one or more documents containing information about a topic (step 408), e.g., through the search engine 118, and a document is located from the database based on a comparison of the query with the metadata associated with a fragment of the document (step 410).

As shown in FIG. 5, in method 500 fragments of the documents are defined (step 502), e.g., with use of the document splitting engine 110 shown in FIG. 1. An order in which the fragments appear in a document is maintained (step 504) and an association between the fragments and the document from which the fragments originated is maintaining (step 506). For example, the order of the fragments in a document and the association between the fragments and the document from which they originated can be maintained in a table stored in the document hierarchy database 112. Metadata is associated with the fragments, where the associated metadata includes metadata related to one or more topics of the fragment (step 508). A query is received for one or more documents containing information about a topic (step 510), e.g., through the search engine 118, and a document is located from the database based on a comparison of the query with the metadata associated with a fragment of the document (step 512).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method of locating documents in a database of electronic documents, the method comprising:
    dividing each document of a plurality of the documents into fragments;
    associating each fragment with the document from which the fragment originated;
    associating metadata with the fragments, wherein the metadata associated with a fragment includes metadata related to one or more topics of the fragment;
    receiving a query for documents containing information about a topic, wherein the query includes at least one term specifying the topic;
    comparing the at least one query terms with the metadata associated with fragments of the documents;
    locating at least one document from the database based on the comparison of the one or more query terms with the metadata associated with the fragments associated with the located document; and
    monitoring the frequency with which individual fragments are identified as relevant to search queries; and
    updating the fragments into which documents of a plurality of the documents are divided based on the monitored frequency with which individual fragments are identified as relevant to search queries.

2. The method of claim 1, wherein dividing a document into fragments comprises defining fragments of the document based on markup tags that indicate logical components of the document.

3. The method of claim 1, wherein dividing a document into fragments comprises defining fragments of the document based on semantic content of different parts of the document.

4. The method of claim 1, wherein the metadata associated with at least one fragment is based on a comparison of information in the fragment with information in an electronic encyclopedia.

5. The method of claim 4, wherein the electronic encyclopedia is a wiki database.

6. A computer-implemented method of locating documents in a database of electronic documents, the method comprising:
    dividing each document of a plurality of the electronic documents into fragments;
    maintaining an order in which the fragments of a document appear in the document;
    maintaining an association between the fragments of a document and the document from which the fragments originated;
    associating metadata with the fragments, wherein the metadata associated with a fragment includes metadata related to one or more topics of the fragment;
    receiving a query for documents containing information about a first topic and about a second topic, wherein the query includes a plurality of query terms specifying the first and second topics;
    comparing the query terms with the metadata associated with fragments of the documents; and
    locating a document in the database that contains information about the first topic and about the second topic based on a comparison of the query terms with the metadata associated with fragments of the located document; and
    monitoring the frequency with which individual fragments are identified as relevant to search queries; and
    updating the fragments into which documents of a plurality of the documents are divided based on the monitored frequency with which individual fragments are identified as relevant to search queries.

7. The method of claim 6, wherein the query includes a request for documents in which the information about the first topic must be contained in a first fragment of a document that is located within a certain proximity of a second fragment of the document that contains information about the second topic,
    and wherein locating the document in the database is based on a comparison of the query terms with the metadata associated with fragments of the document and based on the order in which the fragments containing information about the first and second topics appear in the document.

8. The method of claim 6, wherein the first topic corresponds to a context of the document and wherein the second topic corresponds to a topic of a fragment.

9. The method of claim 6, wherein dividing an electronic document into fragments comprises defining fragments of the document based on markup tags that indicate logical components of the document.

10. The method of claim 6, wherein dividing the documents into fragments comprises dividing the documents into fragments based on dissimilarity measures between parts of the documents.

11. The method of claim 6, wherein the metadata associated with at least one fragment is based on a comparison of information in the fragment with information in an electronic encyclopedia.

12. The method of claim 11, wherein the electronic encyclopedia is a wiki database.

13. A system for locating documents in a database of documents, the system comprising:
- a document splitting engine adapted for splitting each document of a plurality of the documents into fragments;
- a metadata generation engine adapted for associating metadata with the fragments, wherein the metadata associated with a fragment relates to one or more topics of the fragment;
- a memory for storing an order in which fragments of a document appear in the document and for storing an association between the fragments with the document;
- a query engine adapted for receiving a query for documents containing information about a first topic and about a second topic, wherein the query includes a plurality of query terms specifying the first and second topics, for comparing the query terms with the metadata associated with fragments of the documents, and for locating a document in the database based on a comparison of the query terms with the metadata associated with fragments of the document; and
- a document evaluation engine adapted for monitoring the frequency with which individual fragments are identified as relevant to search queries and for updating the fragments into which documents of a plurality of the documents are divided based on the monitored frequency with which individual fragments are identified as relevant to search queries.

14. The system of claim 13, wherein the query includes a request for documents in which the information about the first topic must be contained in a first fragment of a document that is located within a certain proximity of a second fragment of the document that contains information about the second topic,
and wherein locating the document in the database is based on a comparison of the query terms with the metadata associated with fragments of the document and based on the order in which the fragments containing information about the first and second topics appear in the document.

15. The system of claim 13, wherein the first topic corresponds to a context of the document and wherein the second topic corresponds to a topic of a fragment.

16. The system of claim 13, wherein the document splitting engine is adapted for splitting the documents into fragments based on markup tags that indicate logical components of the documents.

17. The system of claim 13, wherein the document splitting engine is adapted for splitting dividing the documents into fragments based on dissimilarity measures between parts of the documents.

18. The system of claim 13, wherein the metadata engine is adapted for associating metadata with a fragment based on a comparison of information in the fragment with information in a wiki database.

* * * * *